United States Patent Office 3,204,517
Patented Sept. 7, 1965

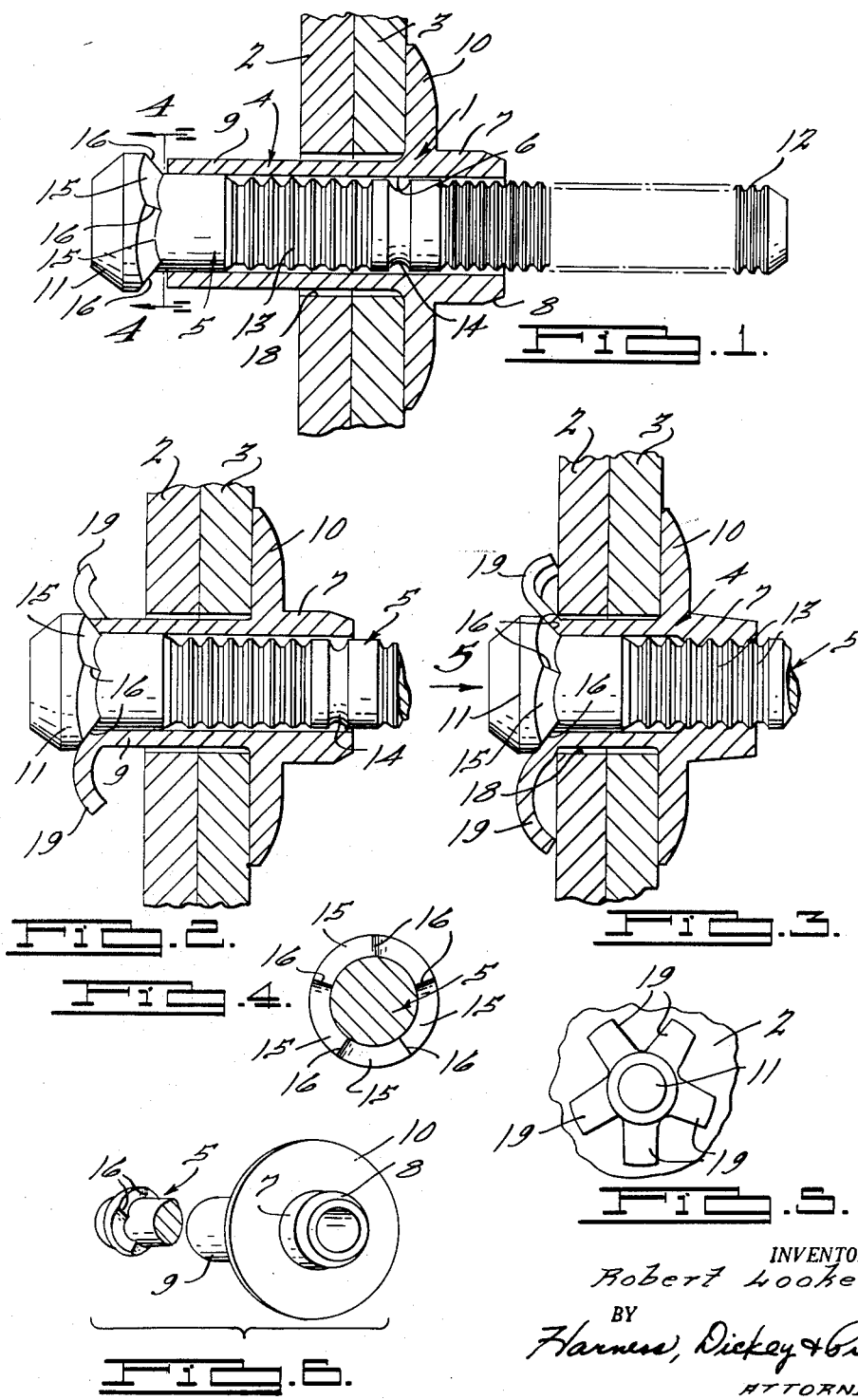

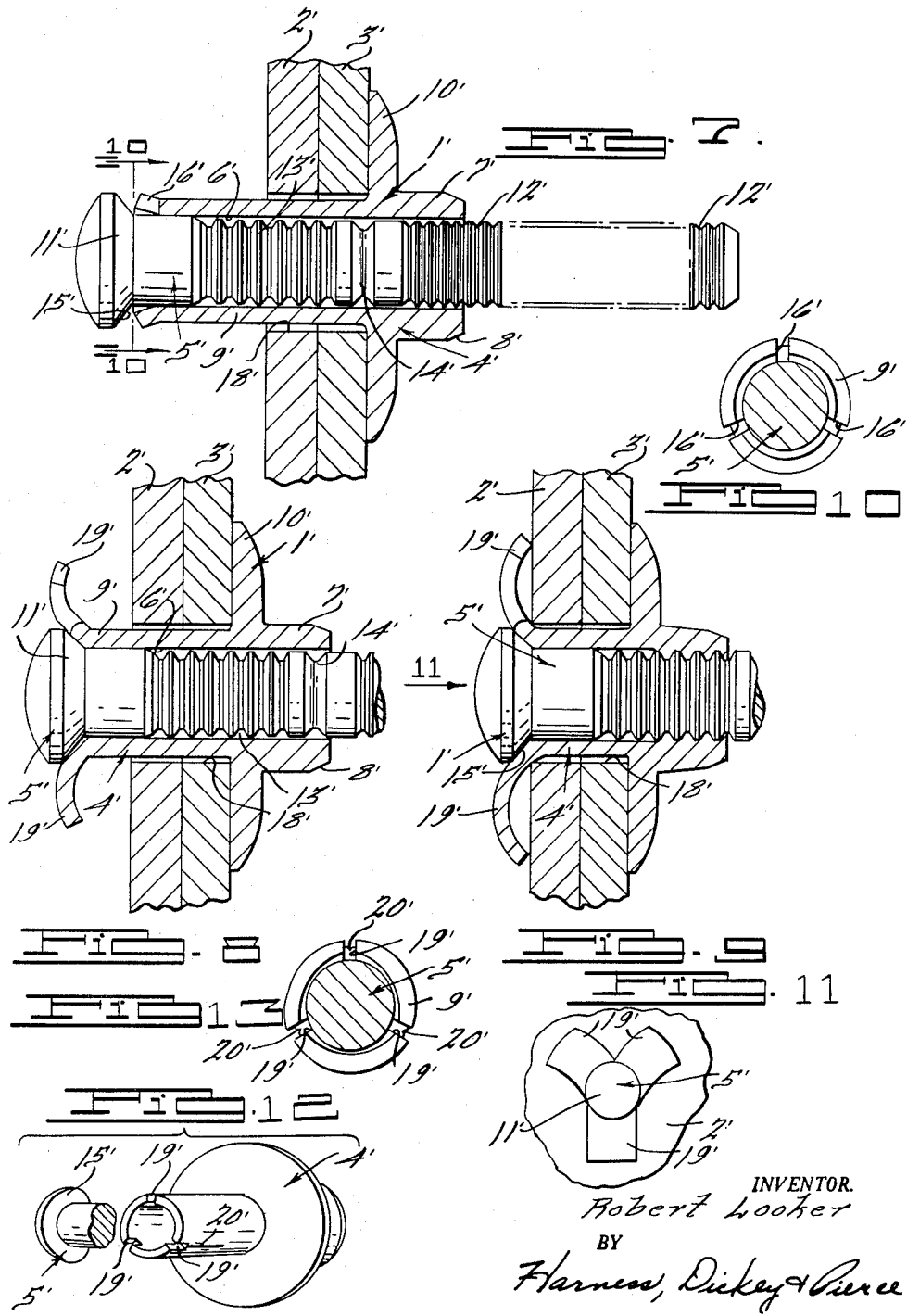

3,204,517
BLIND FASTENER
Robert Looker, Santa Monica, Calif., assignor to Huck Manufacturing Company, Detroit, Mich., a corporation of Michigan
Filed Dec. 8, 1958, Ser. No. 778,879
9 Claims. (Cl. 85—77)

The present invention relates to improvements in blind fastener devices, and particularly to such devices in which the fastener is applied and pulled from one side to secure together a plurality of overlapping or superimposed panel pieces.

This application is a continuation-in-part of my prior copending applications Serial Nos. 533,265 and 533,266, on Blind Fasteners, filed September 9, 1955 and both now abandoned.

Attempts to employ blind fasteners in the securing together of metal panels in the construction business where such panels are formed of relatively thin metals, such as aluminum and corrugated steel, have not been satisfactory. This has been primarily due to the fact that, although the openings are preformed in the metal panels, when the panels are installed on the job there is very often misalignment with the result that, when the panels are pulled to align the openings, usually by a tool inserted through the openings, the openings are distorted or torn, so that they are of irregular size and often oversize for the fasteners used. This tearing and distortion causes burrs of overhanging metal at the holes which keep the sheets from coming together.

The sheets or panels which are secured together by the fastener of the present invention are often separated by the burrs and other distortion, and must be pulled together and secured tightly together by the driven fasteners, which requires considerable force.

One of the primary objects of the present invention is to provide improved fasteners of the type mentioned which may be employed with misaligned, distorted and oversize openings in relatively thin sheet metal panels which will, when applied, pull the panel members together if separated, and tightly secure the panel members together.

Another object of the invention is to provide an improved fastener of the type mentioned which may be economically applied from one side of the work by a relatively fast pulling operation so that the fasteners may be employed where the work is only accessible from one side and also where, while the work may be accessible from both sides, economies are effected in reducing the amount of labor and scaffolding required.

Other objects of the invention will become apparent from the following specification, the drawings relating thereto and from the claims hereinafter set forth.

Further objects, features and advantages of this invention will become apparent from a consideration of the following description, the appended claims and the accompanying drawings in which:

FIGURE 1 is a cross-sectional view with part in elevation of a fastener according to the present invention and showing such fastener in position for application to work, but before the fastener is driven;

FIG. 2 is a view similar to FIG. 1 showing the fastening in an intermediate driven stage;

FIG. 3 is a view similar to FIG. 1 showing the fastener fully driven;

FIG. 4 is a cross-sectional view taken substantially along the line 4—4 of FIG. 1;

FIG. 5 is a reduced end elevational view taken in the direction of the arrow in FIG. 3;

FIG. 6 is a broken perspective view of the fastener;

FIG. 7 is a cross-sectional view with part in elevation of a modified fastener according to the present invention and showing such fastener in position for application to work, but before the fastener is driven;

FIG. 8 is a view similar to FIG. 7 showing the fastener of FIG. 7 in an intermediate driven state;

FIG. 9 is a view similar to FIG. 7 showing the fastener fully driven;

FIG. 10 is a cross-sectional view taken substantially along the line 10—10 of FIG. 7;

FIG. 11 is a reduced end elevational view taken in the direction of the arrow in FIG. 9;

FIG. 12 is a separated and broken perspective view of another modified form of fastener; and FIG. 13 is a cross-sectional view similar to FIG. 10 of the modified form shown in FIG. 12.

Referring to the drawing, the two-part blind fastener of the present invention is generally indicated at 1, and is adapted to pull together, if separated, and secure together relatively thin sheet-like panel members 2 and 3. While the present invention is useful with a variety of materials, it has particular utility when used with relatively thin sheet-like metal members, such as aluminum and galvanized steel. This has particular utility in the building trade where sheet metal members are superimposed or overlapped at their edges and secured together from one side of the work. The openings for the fasteners are preformed in the metal panels, but when they are installed on the job the openings are often misaligned. To align them, a tool is inserted, and this often enlarges or tears the openings.

The fastener 1 comprises a sleeve member generally indicated at 4, and a pin member generally indicated at 5. Such members 4 and 5 are formed of metal, such as steel or aluminum.

In certain broad aspects the structure of the present invention incorporates certain of the structural features of the blind rivet disclosed in Huck Patent No. 2,114,493, and is driven or set by a tool similar to that disclosed in the Huck patent referred to.

The sleeve 4 is formed with an axial opening 6 therethrough and terminates adjacent one end in an annular head 7. The head 7 is formed with an annular taper 8 adjacent one end, which is engaged by the anvil of the rivet setting gun, as disclosed in the Huck patent referred to.

The sleeve 4 has an elongated tubular projection 9 at the opposite end which is of reduced diameter and has an integral annular flange 10 formed at the juncture of the tubular portion 9 with the head 7.

The pin 5 has a preformed head 11 at one end and an elongated stem portion which projects through the opening 6 with the head 11 nearly abutting against the end of the tubular projection 9 when the fastener parts are assembled, as shown in FIG. 1.

The stem terminates at the end opposite the head in a plurality of pull grooves 12 forming a gripping portion for the pulling tool. The stem also has locking grooves 13 formed therein adjacent to, but spaced from the head 11 a predetermined distance with an intermediate cylindrical portion therebetween. Such cylindrical portion is preferably received within the tubular portion 9 with a press fit, and may be smooth or longitudinally serrated. The periphery of the remaining portion of the pin within the sleeve is slightly spaced from the sleeve. The pin is formed with a breakneck 14 of reduced diameter between the pull grooves 12 and the locking grooves 13. The pull grooves 12, locking grooves 13 and breakneck 14 are similar in function to the corresponding elements on the pin shown in the Huck patent above referred to.

According to the present invention, the underside of the head 11 adjacent the end of the tubular projection 9 is formed with a plurality of flats 15, which are disposed at an angle to the longitudinal center line of the pin providing outwardly flaring surfaces, as best shown in FIG. 1. There are five of such surfaces in the embodiment illustrated, but this may be varied. The intersecting surfaces form a plurality of equally spaced cutting edges 16 therearound.

The fastener parts are assembled, as shown in FIG. 1, with the pin 5 projecting through the opening 6, and with the pull grooves 12 projecting beyond the end of the sleeve head 7. The flange 10 overlies the openings of the panel 3. If desired, washers or gaskets may be interposed between the flange 10 and panel 3.

The pin head 11 is disposed adjacent the end of the tubular projection 9 with the adjacent cylindrical portion of the pin disposed within the sleeve in a press fit. In this position the cutting edges 16 are closely adjacent the adjacent edge of the projecting tubular portion 9 with the cutting edges 16 sloping outwardly.

The pin head 11 is preferably slightly larger in diameter than the external diameter of the tubular projection 9, but must be smaller than the smallest opening with which the fastener is adapted to be used.

The fastener 1, as shown in FIG. 1, is positioned through the aligned openings 18 in the panel members 2 and 3, and openings 18 may be oversize and misaligned as related to the external diameter of the tubular portion 9, so that the fastener 1 is disposed therein in a sloppy fit, although the flange 10 extends well beyond the edge of the openings 18.

The fastener is set by a pulling tool, such as that disclosed in the Huck patent above referred to, and such tool has gripping means which engage the pull grooves 12 with an anvil bearing against the taper 8 on the head 7 and applying a reaction force thereto. As the pin 5 is pulled relative to the sleeve 4, the cutting edges 16 engage and cut into the inside edge of the tubular projection 9 and cause the projection 9 to progressively split into five (in the embodiment illustrated) fingers 19. The projecting sleeve 9, and consequently the fingers 19, do not split ahead of engagement by the cutting edges 16, or wander from a straight line, but as a split progresses due to the progressive engagement of the cutting edges 16, the split fingers are caused to flare outwardly against the adjacent tapered or flared surfaces 15 and begin to reversely bend outwardly, as shown in FIG. 2. This reverse bending of the fingers is due to the fact that the split portion of the tubular projection is of a length substantially greater than the length of the surfaces 15, as measured in a direction axially of the pin. If the fingers do not extend substantially beyond the surfaces 15 they will not bend as shown but will only incline outwardly reducing the size of the opening in which the fastener is effective. As the pulling further progresses to the final position shown in FIG. 3, the outer ends of the reversely bent fingers on the sleeve will reversely bend into engagement with the adjacent side of the panel member 2 at positions well beyond the opening 18.

Since the anvil on the pull gun is applying a reaction force against the head 7, the pressure of the fingers as they bend against the sheet 2 will cause the sheets 2 and 3 to be pulled tightly together, if separated. When the head reaches the position adjacent the panel 2, as shown in FIG. 3, the adjacent metal in the sleeve 9 will be crowded against the panel 2 so that relative movement between the pin 5 and sleeve 4 will stop. Thereafter the anvil of the driving tool will move over the head 7 and cause the metal therein to flow into the locking grooves 13 and secure the fastener parts 4 and 5 relative to each other. When further movement of the anvil is prevented, the pull on the pin will reach such a force as to cause the pin to break at the breakneck 14, and the fastener will be finally set, as shown in FIG. 3.

Referring particularly to FIGS. 7–13, a modified two-part blind fastener of the present invention is generally indicated at 1', and is adapted to pull together, if separated, and secure together relatively thin sheet-like panel members 2' and 3'. While the present invention is useful with a variety of materials, it has particular utility when used with relatively thin sheetlike metal members, such as aluminum and galvanized steel. This has particular utility in the building trade where sheet metal members are superimposed or overlapped at their edges and secured together from one side of the work. The openings for the fasteners are preformed in the metal panels, but when they are installed on the job the openings are often misaligned. To align them, a tool is inserted, and this often enlarges or tears the openings.

The fastener 1' comprises a sleeve member generally indicated at 4', and a pin member generally indicated at 5'. Such members 4' and 5' are formed of metal, such as steel or aluminum.

The sleeve 4' is formed with an axial opening 6' therethrough and terminates adjacent one end in an annular head 7'. The head 7' is formed with an annular taper 8' adjacent one end, which is engaged by the anvil of the rivet setting gun, as disclosed in the Huck patent referred to.

The sleeve 4' has an elongated solid tubular projection 9' at the opposite end which is of reduced diameter and has an integral annular flange 10' formed at the juncture of the tubular portion 9' with the head 7'.

The pin 5' has a preformed head 11' at one end and an elongated stem portion which projects through the opening 6' with the head 11' nearly abutting against the end of the tubular projection 9' when the fastener parts are assembled, as shown in FIG. 7.

The stem terminates at the end opposite the head in a plurality of pull grooves 12' forming a gripping portion for the pulling tool. The stem also has locking grooves 13' formed therein adjacent to, but spaced from, the head 11' a predetermined distance with an intermediate cylindrical portion therebetween. Such cylindrical portion is preferably received within the tubular portion 9' with a press fit, and may be smooth or longitudinally serrated. The periphery of the remaining portion of the pin within the sleeve is slightly spaced from the sleeve. The pin is formed with a breakneck 14' of reduced diameter between the pull grooves 12' and the locking grooves 13'. The pull grooves 12', locking grooves 13' and breakneck 14' are similar in function to the corresponding elements on the pin shown in the Huck patent above referred to.

According to the present invention, the underside of the head 11' adjacent the end of the tubular projection 9' is formed with an annular tapered surface 15' which is smooth and disposed at an angle to the longitudinal center line of the pin, as best shown in FIG. 7. The adjacent end of the projection 9' is notched as shown at 16', there being three of such notches illustrated, but it being understood that this number may be varied. The notches extend only slightly longitudinally of the tubular part 9' and are slightly flared outwardly.

The fastener parts are assembled, as shown in FIG. 7, with the pin 5' projecting through the opening 6', and with the pull grooves 12' projecting beyond the end of the sleeve head 7'. The flange 10' overlies the openings of the panel 3'. If desired, washers or gaskets may be interposed between the flange 10' and panel 3'.

The pin head 11' is disposed adjacent the notched end of the tubular projection 9' with the adjacent cylindrical portion of the pin disposed within the sleeve in a press fit. In this position the tapered surface 15' is closely adjacent the notches 16' of the projecting tubular portion 9'.

The pin head 11' is preferably slightly larger in diameter than the external diameter of the tubular projection 9', but must be smaller than the smallest opening with which the fastener is adapted to be used.

The fastener 1', as shown in FIG. 7, is positioned through the aligned openings 18' in the panel members 2' and 3', and openings 18' may be oversize and misaligned as related to the external diameter of the tubular portion 9', so that the fastener 1' is disposed therein in a sloppy fit, although the flange 10' extends well beyond the edge of the openings 18'.

The fastener is set by a pulling tool, such as that disclosed in the Huck patent above referred to, and such tool has gripping means which engage the pull grooves 12' with an anvil bearing against the taper 8' on the head 7' and applying a reaction force thereto. As the pin 5' is pulled relative to the sleeve 4', the surface 15' engages the inside edge of the tubular projection 9' at the notches and causes the projection 9' to progressively split into three (in the embodiment illustrated) fingers 19'. The projecting sleeve 9', and consequently the fingers 19', do not split ahead of engagement by the surface 15', but as the splits progress due to the progressive engagement of the surface, the split fingers are caused to flare outwardly against the adjacent tapered or flared surfaces 15' and begin to reversely bend outwardly, as shown in FIG. 8. As the pulling further progresses to the final position shown in FIG. 3, the outer ends of the reversely bent fingers on the sleeve will reversely bend into engagement with the adjacent side of the panel member 2' at positions well beyond the opening 18'. The relatively larger size of the head 11' compared to the sleeve 9' contributes to this flaring out and reverse bend.

Since the anvil on the pull gun is applying a reaction force against the head 7', the pressure of the fingers 19' as they bend against the sheet 2' will cause the sheets 2' and 3' to be pulled tightly together, if separated. When the head reaches the position adjacent the panel 2', as shown in FIG. 3, the adjacent metal in the sleeve 9' will be crowded against the panel 2' so that relative movement between the pin 5' and sleeve 4' will stop. Thereafter the anvil of the driving tool will move over the head 7' and cause the metal therein to flow into the locking grooves 13' and secure the fastener parts 4' and 5' relative to each other. When further movement of the anvil is prevented, the pull on the pin will reach such a force as to cause the pin to break at the breakneck 14', and the fastener will be finally set, as shown in FIG. 9.

In the modification shown in FIGS. 12 and 13 the structure is the same as in FIGS. 7–11 except that the outside peripheral surface only of the sleeve 9' is longitudinally scored at the base of each notch 16', as indicated at 20', so as to insure against the splits wandering from straight lines as the splits progress.

Although the invention has been described with respect to a preferred embodiment thereof, it is to be understood that it is not to be so limited, since changes can be made therein which are within the scope of the invention as defined by the appended claims.

What is claimed is:

1. A blind fastener for attaching together overlapping members having substantially aligned openings, said fastener comprising an imperforate tubular member adapted to be positioned in said openings so that a portion of the tubular member is located on one side of said overlapping members, a pin having a head at one end of a diameter substantially equal to the outer diameter of the tubular member portion and an annular surface adjacent said head inclined radially outwardly of the pin in the direction of said one end, said pin having a stem extending through said tubular member so that the annular surface is arranged in a substantially concentric relation with and against the end of said tubular member on said one side of the overlapping members, gripping means on said stem on the opposite side of said overlapping members adapting the pin for being pulled in a direction to move said pin head toward said overlapping members, said pin having at least three substantially equally spaced cutting edges formed on said inclined surface adapted to split said portion of the tubular member longitudinally thereof along predetermined lines so that said annular surface is progressively engageable with said split portion for bending laterally the split parts of said portion, said split portion being of a length substantially greater than the length of said annular surface measured in a direction axially of said pin to form when split and bent a plurality of reversely curved locking fingers extending radially of said tubular member and engageable at their free ends with the one side of said overlapping members, and annular shoulder means on said tubular member facing said pin head and engageable with the opposite side of said overlapping members so that the overlapping members are clamped between said fingers and said shoulder means, said tubular member having a portion thereof located outwardly of said shoulder means adapted to be secured to an adjacent portion of said pin for maintaining the pin in a fixed position relative to the tubular member.

2. A blind fastener for attaching together overlapping members having substantially aligned openings, said fastener comprising an imperforate tubular member adapted to be positioned in said openings so that a portion of the tubular member is located on one side of said overlapping members, a pin having a head at one end of a diameter substantially equal to the outer diameter of the tubular member portion and an annular surface adjacent said head inclined radially outwardly of the pin in the direction of said one end, said pin having a stem extending through said tubular member so that the annular surface is arranged in a substantially concentric relation with and against the end of said tubular member on said one side of the overlapping members, gripping means on said stem on the opposite side of said overlapping members adapting the pin for being pulled in a direction to move said pin head toward said overlapping members, said pin having at least three substantially equally spaced cutting edges formed thereon adjacent said head adapted to split said portion of the tubular member longitudinally thereof along predetermined lines so that said annular surface is progressively engageable with said split portion for bending laterally the split parts of said portion, said split portion being of a length substantially greater than the length of said annular surface measured in a direction axially of said pin to form when split and bent a plurality of reversely curved locking fingers extending radially of said tubular member and engageable at their free ends with the one side of said overlapping members, and annular shoulder means on said tubular member facing said head and engageable with the opposite side of said overlapping members so that the overlapping members are clamped between said fingers and said shoulder means, said tubular member having a portion outwardly of said shoulder means adapted to be swaged into engagement with said pin on said opposite side of the overlapping members for maintaining the pin in a fixed position relative to the tubular member, and having the portion thereof to be swaged of an increased thickness relative to the portion on said one side of the overlapping members for resisting swaging until said splitting has been completed.

3. A blind fastener adapted to be inserted in an aperture in a structural member, said fastener comprising an imperforate tubular member having an integral elongated portion at one end, a pin extending axially through said tubular member, said pin having a head portion at one end of a diameter substantially equal to the outer diameter of the tubular member portion, pull means on said pin adjacent the opposite end thereof adapted to be gripped for moving said pin in a direction to advance said head portion into engagement with said tubular member portion, one of said portions being formed adjacent the points of contact of said portions for causing progressive splitting of said tubular member portion along at least three substantially equally spaced lines parallel to the axis of said tubular member portion, said head portion having an inclined annular surface on the underside thereof engageable during said movement of the pin head portion with the split portion of said tubular member for bending laterally the split parts of said portion, said split portion being of a length substantially greater than the length of said annular surface measured in a direction axially of said pin to form when split and bent a plurality of reversely curved locking fingers extending radially outwardly of said tubular member for engagement at their free ends with one side of said structural member, said tubular member having a head at the opposite end provided with an outwardly extending annular shoulder of a diameter greater than the outer diameter of said elongated portion, said head on the tubular member having a portion outwardly of said shoulder adapted to be swaged into interlocking engagement with said pin intermediate the ends thereof for locking the pin to the tubular member after completion of said splitting.

4. A blind fastener adapted to be inserted in an aperture in a structural member and adapted to be applied with a fastener applying tool having an anvil and jaws and means for moving the anvil and jaws in opposite directions relative to each other, said fastener comprising a tubular member having an integral elongated projection at one end and a head at the opposite end, a pin extending axially through said tubular member, said pin having a head at one end formed on the side thereof inwardly of the pin with an annular surface which is inclined radially outwardly toward said one end, said pin head having a diameter substantially equal to the outer diameter of the projection, said projection being formed with at least three substantially equally spaced parallel wall portions of reduced thickness extending longitudinally of the projection parallel to the axis thereof so that it is splittable along predetermined lines corresponding to said wall portions when said pin head is moved longitudinally of the tubular member so that said inclined surface progressively engages the inner surface thereof, said reduced wall portions being of a thickness such that during said pin movement splitting of the projection is confined to the portion thereof between the outer end of said projection and said inclined surface, said inclined surface being progressively engageable with said split portion for bending laterally the split parts of said portion, said projection being of a length substantially greater than the length of said annular surface measured in a direction axially of said pin to form when split and bent a plurality of reversely curved locking fingers extending radially of said tubular member and engageable at their free ends with one side of said structural member, pull means on said pin adjacent the opposite end thereof adapted to be engaged by said jaws for pulling said pin so that said tubular projection is split, said head on the tubular member having an annular shoulder facing said pin head and a portion outwardly of the shoulder deformable by said anvil into interlocking engagement with said pin after splitting of said projection is completed.

5. A blind fastener for attaching overlapping members having substantially aligned openings extending therethrough, said fastener comprising a tubular member adapted to be positioned in said openings so that a portion of the tubular member is located on one side of said overlapping members, a pin having a head at one end and a stem and an annular surface adjacent said head inclined radially of the pin in the direction of said one end, said pin head being of a diameter substantially equal to the portion of said tubular member on said one side of the overlapping members, said stem extending through said tubular member with the annular surface arranged in a substantially concentric facing relation with the end of said tubular member on said one side of the overlapping members, said stem being of a diameter at all positions lengthwise thereof either less than or substantially equal to the inner diameter of said tubular member, gripping means on said stem on the opposite side of said overlapping members adapting the pin for being pulled in a direction to move said pin head toward said overlapping members, said tubular member portion being formed with at least three substantially equally spaced parallel score lines extending parallel to the axis thereof and notches disposed at said end of the tubular member in positions aligned with said score lines so that the portion is splittable longitudinally along said score lines when said pin head is moved longitudinally of the tubular member so that said inclined surface progressively engages the inner surface thereof and bends laterally the split parts of said tubular member, said split portion being of a length substantially greater than the length of said annular surface measured in a direction axially of the pin to form when split and bent a plurality of reversely curved locking fingers extending radially of said tubular member and engageable at their free ends with the one side of said overlapping members, and integral shoulder means on said tubular member engageable with the opposite side of said overlapping members so that the overlapping members are clamped between said fingers and said shoulder means, said tubular member having a head portion integral with said shoulder means disposed on said opposite side of the overlapping members and adapted to be secured to said pin for maintaining the pin in a fixed position relative to the tubular member in the position of said fastener clamping the overlapping members between the fingers and the shoulder means.

6. A blind fastener adapted to be inserted in an aperture in a structural member, said fastener comprising an imperforate tubular member having an integral elongated portion at one end, a pin extending axially through said tubular member, said pin having a head portion at one end of a diameter substantially equal to the outer diameter of the tubular member portion, pull means on said pin adjacent the opposite end thereof adapted to be gripped for moving said pin in a direction to advance said head portion into engagement with said tubular member portion, one of said portions being formed adjacent the points of contact of said portions for causing progressive splitting of said tubular member portion along at least three substantially equally spaced lines parallel to the axis of said tubular member portion, said head portion having an inclined annular surface on the underside thereof engageable during said movement of the pin head portion with the split portion of said tubular member for bending laterally the split parts of said portion, said split portion being of a length substantially greater than the length of said annular surface measured in a direction axially of said pin to form when split and bent, a plurality of reversely curved locking fingers extending radially outwardly of said tubular member for engagement at their free ends with one side of said structural member, said tubular member having a head at the opposite end provided with an outwardly extending annular shoulder of a diameter greater than the outer diameter of said elongated portion, said head on the tubular member having a portion outwardly of said shoulder adapted to be secured to an adjacent portion of said pin for locking the pin to the tubular member after completion of said splitting.

7. A blind fastener adapted to be inserted in an aperture in a structural member and adapted to be applied with a fastener applying tool having an anvil and jaws and means for moving the anvil and jaws in opposite directions relative to each other, said fastener comprising a tubular member having an integral elongated projection at one end and a head at the opposite end, a pin extending axially through said tubular member, said pin having a head at one end formed on the side thereof inwardly of the pin with an annular surface which is inclined radially outwardly toward said one end, said pin head having a diameter substantially equal to the outer diameter of the projection, said projection being formed with at least three substantially equally spaced parallel wall portions of reduced thickness extending longitudinally of the projection parallel to the axis thereof so that it is splittable along predetermined lines corresponding to said wall portions when said pin head is moved longitudinally of the tubular member so that said inclined surface progressively engages the inner surface thereof, said reduced wall portions being of a thickness such that during said pin movement splitting of the projection is confined to the portion thereof between the outer end of said projection and said inclined surface, said inclined surface being progressively engageable with said split portion for bending laterally the split parts of said portion, said projection being of a length substantially greater than the length of said annular surface measured in a direction axially of said pin to form when split and bent a plurality of reversely curved locking fingers extending radially of said tubular member and engageable at their free ends with one side of said structural member, pull means on said pin adjacent the opposite end thereof adapted to be engaged by said jaws for pulling said pin so that said tubular projection is split, said head on the tubular member having an annular shoulder facing said pin head and a portion outwardly of the shoulder adapted to be secured to an adjacent portion of said pin for locking the tubular member to the pin after splitting of said projection is completed.

8. A blind fastener for attaching overlapping members having substantially aligned openings extending therethrough, said fastener comprising a tubular member adapted to be positioned in said openings so that a portion of the tubular member is located on one side of said overlapping members, a pin having a head at one end and a stem and an annular surface adjacent said head inclined radially outwardly of the pin in the direction of said one end, said pin head being of a diameter substantially equal to the portion of said tubular member on said one side of the overlapping members, said stem extending through said tubular member with the annular surface arranged in a substantially concentric facing relation with the end of said tubular member on said one side of the overlapping members, gripping means on said stem on the opposite side of said overlapping members adapting the pin for being pulled in a direction to move said pin head toward said overlapping members, said tubular member portion being formed with at least three substantially equally spaced parallel score lines extending parallel to the axis thereof, and notches disposed at said end of the tubular member in positions aligned with said score lines so that the portion is splittable longitudinally along said score lines when said pin head is moved longitudinally of the tubular member so that said inclined surface progressively engages the inner surface thereof and bends laterally the split parts of said tubular member, said split portion being of a length substantially greater than the length of said annular surface measured in a direction axially of the pin to form when split and bent a plurality of reversely curved locking fingers extending radially of said tubular member and engageable at their free ends with the one side of said overlapping members, and integral shoulder means on said tubular member engageable with the opposite side of said overlapping members so that the overlapping members are clamped between said fingers and said shoulder means, said tubular member having a head portion integral with said shoulder means disposed on said opposite side of the overlapping members and adapted to be secured to said pin for maintaining the pin in fixed position relative to the tubular member in the position of said fastener clamping the overlapping members between the fingers and the shoulder means.

9. A blind fastener for attaching overlapping members having substantially aligned openings extending therethrough, said fastener comprising a tubular member adapted to be positioned in said openings so that a portion of the tubular member is located on one side of said overlapping members, a pin having a head at one end and a stem and an annular surface adjacent said head inclined radially outwardly of the pin in the direction of said one end, said pin head being of a diameter substantially equal to the portion of said tubular member on said one side of the overlapping members, said stem extending through said tubular member with the annular surface arranged in a substantially concentric facing relation with the end of said tubular member on said one side of the overlapping members, gripping means on said stem on the opposite side of said overlapping members adapting the pin for being pulled in a direction to move said pin head toward said overlapping members, said tubular member portion being formed with at least three substantially equally spaced parallel score lines extending parallel to the axis and each forming a channel which is open at its extremity proximate said end thereof so that the portion is splittable longitudinally along said score lines when said pin head is moved longitudinally of the tubular member so that said inclined surface progressively engages the inner surface thereof and bends laterally the split parts of said tubular member, said split portion being of a length substantially greater than the length of said annular surface measured in a direction axially of the pin to form when split and bent a plurality of reversely curved locking fingers extending radially of said tubular member and engageable at their free ends with the one side of said overlapping members, and integral shoulder means on said tubular member engageable with the opposite side of said overlapping members so that the overlapping members are clamped between said fingers and said shoulder means, said tubular member having a head portion integral with said shoulder means disposed on said opposite side of the overlapping members and adapted to be secured to said pin for maintaining the pin in fixed position relative to the tubular member in the position of said fastener clamping the overlapping members between the fingers and the shoulder means.

References Cited by the Examiner

UNITED STATES PATENTS

| | | | |
|---|---|---|---|
| 339,951 | 4/86 | Wahlert | 85—77 X |
| 420,829 | 2/90 | Platt | 85—37 |
| 480,031 | 8/92 | Platt | 118—266 |
| 614,547 | 11/98 | Haworth | 72—477 |
| 672,884 | 4/01 | Bennett | 220—24 |
| 1,447,670 | 3/23 | Lane et al. | 72—422 |
| 1,610,664 | 12/26 | Ellison | 29—469 |
| 1,621,598 | 3/27 | Phillips | 85—68 |
| 1,643,771 | 9/27 | Iseman | 85—84 |
| 1,748,951 | 3/30 | Gookin | 29—512 |
| 1,756,257 | 4/30 | Neuberth | 72—325 |
| 1,826,705 | 10/31 | Carr | 85—84 |
| 1,900,099 | 3/33 | Ferguson | 268—53 |
| 1,944,513 | 1/34 | Johnson | 85—84 |
| 1,996,121 | 4/35 | Phillips | 85—68 |
| 1,996,128 | 4/35 | Thomson | 85—67 |
| 2,029,944 | 2/36 | Roddy | 10—26 |
| 2,058,338 | 10/36 | Meissner | 85—84 |
| 2,061,628 | 11/36 | Huck | 85—70 X |
| 2,092,682 | 9/37 | Roske | 85—71 X |
| 2,114,493 | 4/38 | Huck | 85—78 X |
| 2,150,080 | 3/39 | Rawlings | 85—83 |
| 2,264,747 | 12/41 | Fether | 85—82 |
| 2,302,590 | 11/42 | Waite | 85—84 |

(Other references on following page)

UNITED STATES PATENTS

| | | | |
|---|---|---|---|
| 2,314,445 | 3/43 | Du Vall | 85—63 |
| 2,326,855 | 8/43 | Hathorn | 85—22 |
| 2,343,283 | 3/44 | Davis | 89—138 |
| 2,389,479 | 11/45 | Austin | 85—78 |
| 2,405,898 | 8/46 | Milone et al. | 29—509 |
| 2,409,180 | 10/46 | Annett et al. | 85—38 |
| 2,525,117 | 10/50 | Campbell | 85—77 |
| 2,538,623 | 1/51 | Keating | 85—78 |
| 2,542,144 | 2/51 | Kearns | 85—72 |
| 2,553,051 | 5/51 | Kingman | 85—84 |
| 2,635,501 | 4/53 | Eichner | 85—72 |
| 2,668,468 | 2/54 | Flogaus | 85—84 |
| 2,751,809 | 6/56 | Barker | 85—82 |
| 2,803,984 | 8/57 | Swenson | 85—77 |
| 2,877,682 | 3/59 | Barry et al. | 85—84 |
| 2,887,694 | 5/59 | Sauter | 85—72 |

FOREIGN PATENTS

| | | |
|---|---|---|
| 928,122 | 5/47 | France. |
| 280,261 | 4/52 | Switzerland. |

EDWARD C. ALLEN, *Primary Examiner.*

ARTHUR B. MILLER, *Examiner.*